June 15, 1948. D. L. ANNON 2,443,218
ANIMAL POKE
Filed Feb. 20, 1947 2 Sheets-Sheet 1

Inventor
Dewey L. Annon

By Clarence A. O'Brien
and Harvey B. Jacobson
Attorneys

June 15, 1948.  D. L. ANNON  2,443,218
ANIMAL POKE

Filed Feb. 20, 1947  2 Sheets-Sheet 2

Inventor
Dewey L. Annon.

By *Clarence A. O'Brien*
*and Harvey B. Jacobson*
Attorneys

Patented June 15, 1948

2,443,218

UNITED STATES PATENT OFFICE 2,443,218

ANIMAL POKE

Dewey L. Annon, Caldwell, Idaho

Application February 20, 1947, Serial No. 729,783

2 Claims. (Cl. 119—142)

This invention relates to new and useful improvements and structural refinements in animal pokes, and the principal object of the invention is to provide a device of the character herein described, such as may be conveniently and effectively employed for restraining cows, horses and other live stock, more specifically, for preventing such animals from attempting to crawl through or under the bars of a fence or gate.

A further object of the invention is to provide a poke which may be readily applied to and removed from the head of the animal.

Another object of the invention is to provide a poke which will not interfere with other natural actions of the animal, such as eating, drinking, or the like.

An additional object of the invention is to provide an animal poke which is simple in construction, which will not easily become damaged and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a perspective view of the invention, showing the same in situ on the head of the animal.

Figure 2 a side elevation of the invention per se.

Like characters of reference are used to designate like parts in the specification and throughout the several views.

Figure 1:
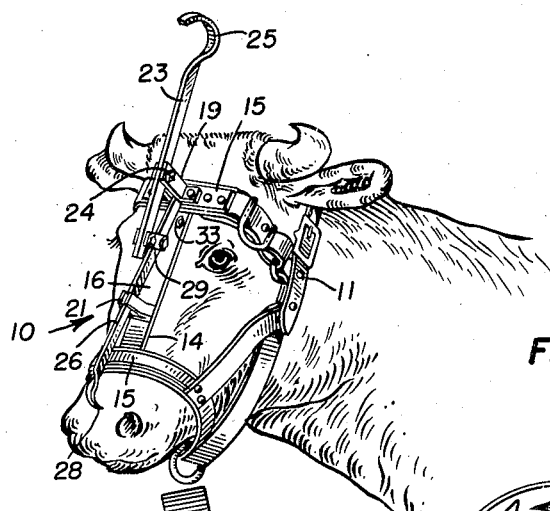
Figure 2:
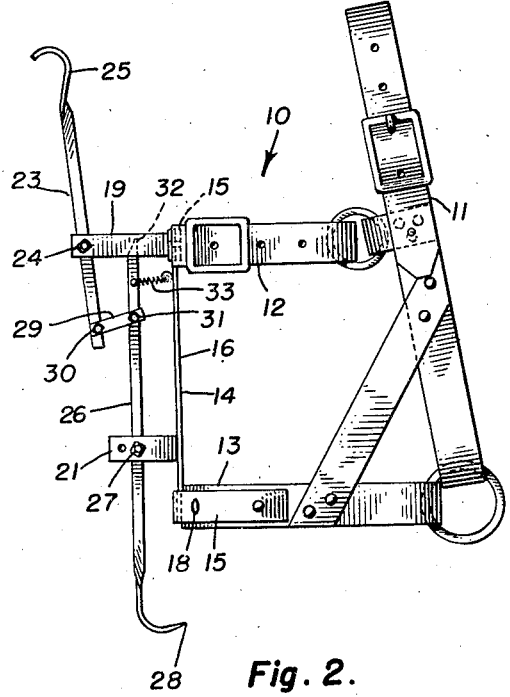
Figure 3:
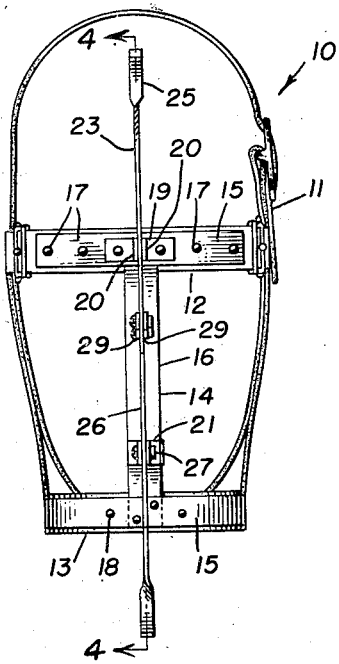
Figure 3 is a front view of the device shown in Figure 2.

Referring now to the accompanying drawings in detail, the invention consists of an animal poke designated generally by the reference character 10, the same embodying in its construction a head stall 11 of more or less conventional design, including a transversely extending head strap 12 and a nose strap 13. The stall 11 is, of course, adapted for removable positioning on the head of the animal and detailed description of its component parts is considered unnecessary since stalls of various types may be employed.

The essence of the invention resides in the provision of a substantially I-shaped frame 14 consisting of a pair of transverse portions or members 15 rigidly connected together by an intermediate portion 16. The upper of the members 15 is secured to the head strap 12 by means of suitable rivets 17, while the lower member 15 is similarly secured to the nose strap 13 by the rivets 18. If desired, the members 15 may be arcuated in conformity with the curvature of the respective straps 12 and 13, as is exemplified in the accompanying Figure 6.

Figures 4, 5, 6:
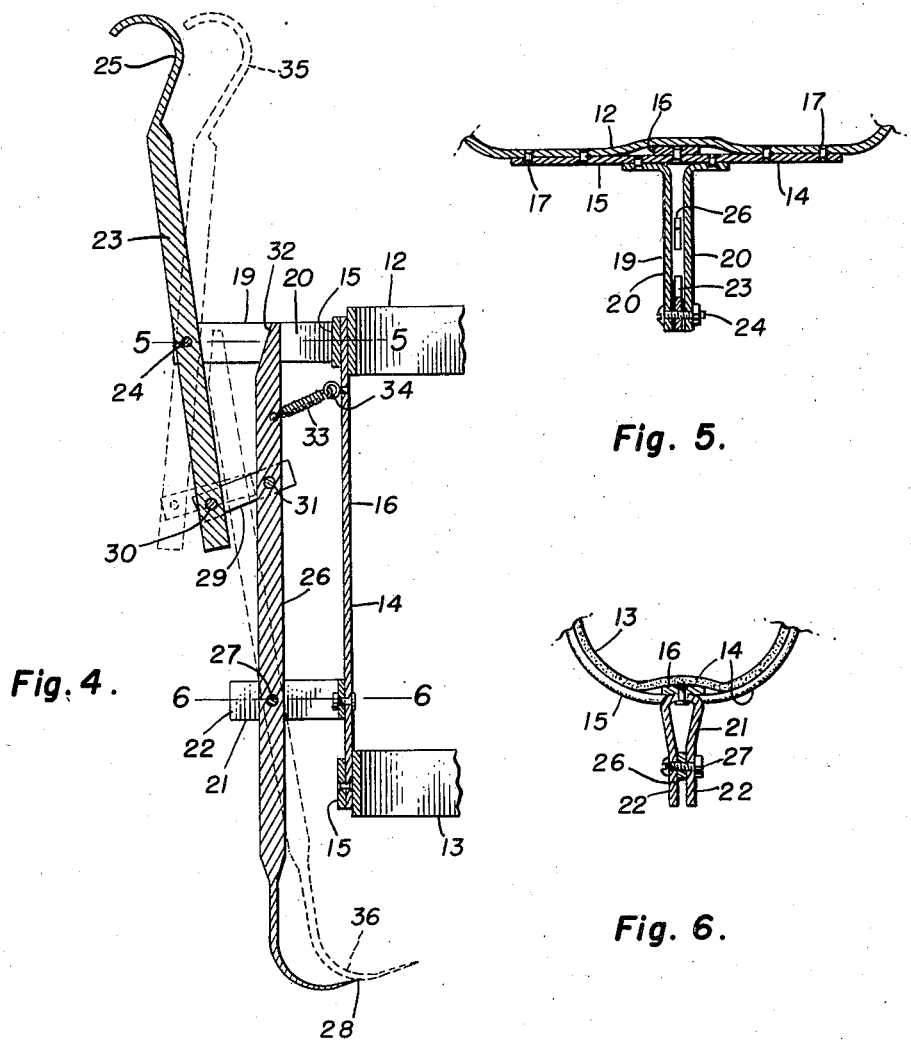
Figure 4 is a cross sectional view, taken substantially in the plane of the line 4—4 in Figure 3.
Figure 5 is a cross sectional view, taken substantially in the plane of the line 5—5 in Figure 4.
Figure 6 is a cross sectional view, taken substantially in the plane of the line 6—6 in Figure 4.

A forwardly extending bracket 19, consisting of a pair of opposed angle strips 20, is secured to the upper member 15 of the frame 14, the strips 20 being spaced apart as shown in Figure 5. A substantially U-shaped bracket 21, including a pair of spaced side arms 22, is secured to the intermediate portions 16 of the frame 14 adjacent the lower of the members 15.

An actuating bar 23 is pivoted medially of its length as at 24 between the strips 20 of the bracket 19, one end portion of the bar extending above the head of the animal and terminating in a forwardly arcuated hook 25. A poke lever 26 is pivoted medially of its length as at 27 between the arms 22 of the bracket 21, as will be clearly apparent from the accompanying drawings.

The lower end portion of the lever 26 is rearwardly arcuated and terminates in a point of extremity 28, the purpose of which will be hereinafter more fully explained.

The upper end portion of the lever 26 is operatively connected to the lower end portion of the bar 23 by means of a pair of spaced links 29, the pivoted connection of the latter being indicated at 30 and 31.

It will be noted that the upper extremity 32 of the lever 26 is movably positioned between the strips 20 of the bracket 19, and a suitable tension spring 33 is anchored at one end thereof to the upper end portion of the lever, while its remaining end is secured to an eye 34 provided on the frame member 16.

When the invention is placed in use, the device is mounted upon the head of the animal by means of the stall 11, substantially as shown in Figure 1. The bar 23 will project above the animal's head as already explained, and when the animal endeavors to crawl under or between the bars of a fence or gate, the bar 23 will be brought in contact with such bar and will be forced rearwardly, as indicated by the dotted line 35 in Figure 4.

This movement of the bar 23 will be transmitted through the medium of the link 29 to the lever 26 and the lower end of the latter will be moved rearwardly as indicated at 36. As a result, the point of extremity 28 will be brought in contact with the animal's nose, and the animal will thus be effectively restrained or discouraged from continuing its undesirable effort.

It should be observed that the extremity 32 of the lever 26 is engageable with the bar 23, thereby functioning as a stop for preventing the penetration of the extremity 28 into the animal's nose.

The spring 33 will, of course, automatically return the lever 26 to its inactive position, as soon as pressure against the bar 23 is relieved.

It is believed that the advantages and use of the invention will be clearly apparent from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. An animal poke comprising in combination, a head stall including a head strap and a nose strap, a substantially I-shaped frame having each transverse portion thereof secured to one of said straps, an actuating bar pivoted medially of its length to the upper end of said frame, one end portion of said bar extending above the animal's head, a poke lever pivoted medially of its length adjacent the lower end of said frame, a link pivotally connecting together the adjacent end portions of said lever and said bar, the remaining end portion of said lever being adapted to engage the animal's nose, and a tension spring for urging said lever to the inactive position.

2. An animal poke comprising in combination, a head stall including a head strap and a nose strap, a substantially I-shaped frame having each transverse portion thereof secured to one of said straps, an upper and a lower bracket secured to said frame adjacent said head strap and said nose strap respectively, an actuating bar pivoted medially of its length to said upper bracket, one end of said bar extending above the animal's head and terminating in a forwardly arcuated hook, a poke lever pivoted medially of its length to said lower bracket, the lower end portion of said lever being arcuated and terminating in a pointed extremity adapted to engage the animal's nose, the upper end of said lever being engageable with said bar and providing a stop, a link pivotally connecting the upper end portion of said lever to the lower end portion of said bar, and a tension spring for urging said lever to the inactive position.

DEWEY L. ANNON.

REFERENCES CITED

The following references are of record in the file of this patent:

UNITED STATES PATENTS

| Number | Name | Date |
| --- | --- | --- |
| 453,197 | Marquis | June 2, 1891 |